United States Patent
Koyama

(10) Patent No.: US 9,842,420 B2
(45) Date of Patent: Dec. 12, 2017

(54) IMAGE PROCESSING DEVICE AND METHOD FOR CREATING A REPRODUCTION EFFECT BY SEPARATING AN IMAGE INTO A FOREGROUND IMAGE AND A BACKGROUND IMAGE

(71) Applicant: Sony Corporation, Tokyo (JP)

(72) Inventor: Masae Koyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/472,032

(22) Filed: Mar. 28, 2017

(65) Prior Publication Data

US 2017/0200299 A1 Jul. 13, 2017

Related U.S. Application Data

(60) Division of application No. 15/067,403, filed on Mar. 11, 2016, now Pat. No. 9,646,405, which is a continuation-in-part of application No. 14/063,512, filed on Oct. 25, 2013, now Pat. No. 9,519,983.

(30) Foreign Application Priority Data

Nov. 12, 2012 (JP) ................................ 2012-248391

(51) Int. Cl.
*G06T 11/60* (2006.01)
*G06T 7/11* (2017.01)
*G06T 7/194* (2017.01)

(52) U.S. Cl.
CPC ............... *G06T 11/60* (2013.01); *G06T 7/11* (2017.01); *G06T 7/194* (2017.01); *G06T 2207/10016* (2013.01); *G06T 2207/20221* (2013.01)

(58) Field of Classification Search
CPC .. H04N 5/2226; H04N 5/272; H04N 5/23229; G06T 7/0079; G06T 7/0051; G06T 2207/20144; G06T 13/80; G06T 3/4038; G06T 11/60
USPC ....................................................... 348/218.1
See application file for complete search history.

(56) References Cited

U.S. PATENT DOCUMENTS

| | | | |
|---|---|---|---|
| 6,268,864 B1 | 7/2001 | Chen et al. | |
| 7,024,054 B2* | 4/2006 | Cahill | G06T 5/50 345/589 |
| 7,720,283 B2* | 5/2010 | Sun | G06K 9/38 382/173 |
| 8,294,824 B2* | 10/2012 | Kataoka | H04N 5/272 348/586 |
| 8,581,930 B2* | 11/2013 | Sio | G06T 13/80 345/419 |
| 8,698,910 B2 | 4/2014 | Aisaka et al. | |

(Continued)

*Primary Examiner* — Pritham Prabhakher
(74) *Attorney, Agent, or Firm* — Oblon, McClelland, Maier & Neustadt, L.L.P.

(57) ABSTRACT

According to an illustrative embodiment, an image processing device is provided. The image processing device includes a foreground selection processing circuit to select at least one foreground image that has been separated from a source image; a background selection circuit to select at least two display background images from at least one background image that has been separated from the source image; and a combination circuit to combine the at least one selected foreground image with the at least two display background images to generate a plurality of combined images, wherein at least one of the plurality of combined images does not appear in the source image.

12 Claims, 11 Drawing Sheets

(56) References Cited

U.S. PATENT DOCUMENTS

| | | | |
|---|---|---|---|
| 8,823,739 B2* | 9/2014 | Baron, Jr. | H04N 7/15 345/632 |
| 8,885,885 B2* | 11/2014 | Datta | G06K 9/00778 382/103 |
| 8,982,179 B2 | 3/2015 | North et al. | |
| 9,129,400 B1 | 9/2015 | Ivanchenko et al. | |
| 2002/0027600 A1 | 3/2002 | Yamanaka et al. | |
| 2003/0058939 A1* | 3/2003 | Lee | H04N 7/147 375/240.08 |
| 2004/0017504 A1* | 1/2004 | Prandoni | H04N 5/2625 348/370 |
| 2004/0062439 A1* | 4/2004 | Cahill | G06T 5/50 382/173 |
| 2007/0216675 A1* | 9/2007 | Sun | G06T 11/00 345/419 |
| 2008/0303949 A1* | 12/2008 | Ciudad | H04N 7/147 348/586 |
| 2009/0327425 A1 | 12/2009 | Gudipaty | |
| 2010/0013988 A1 | 1/2010 | Hulyalkar et al. | |
| 2010/0092085 A1 | 4/2010 | Marchesotti | |
| 2010/0172586 A1* | 7/2010 | Sorek | G06T 11/60 382/181 |
| 2010/0245609 A1 | 9/2010 | Estevez et al. | |
| 2011/0206282 A1* | 8/2011 | Aisaka | G06T 11/60 382/195 |
| 2011/0216976 A1* | 9/2011 | Rother | G06K 9/34 382/173 |
| 2012/0019613 A1 | 1/2012 | Murray et al. | |
| 2012/0237125 A1 | 9/2012 | Chew | |
| 2012/0327172 A1 | 12/2012 | El-Saban et al. | |
| 2013/0084006 A1 | 4/2013 | Zhang et al. | |
| 2013/0155047 A1 | 6/2013 | Williams et al. | |
| 2013/0215226 A1 | 8/2013 | Chauvier et al. | |
| 2014/0009772 A1 | 1/2014 | Gao | |
| 2014/0368669 A1 | 12/2014 | Talvala et al. | |

* cited by examiner

FIG. 8
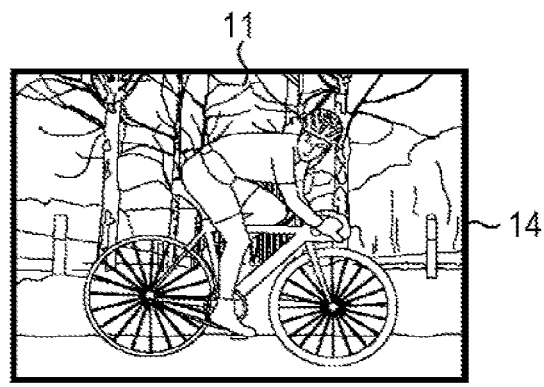
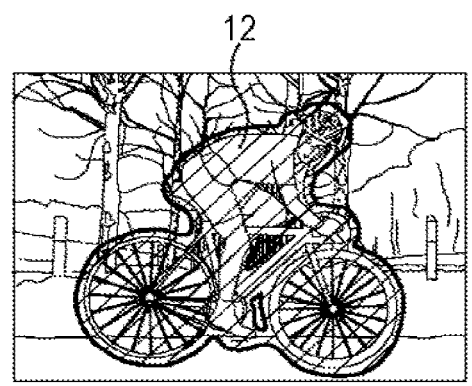
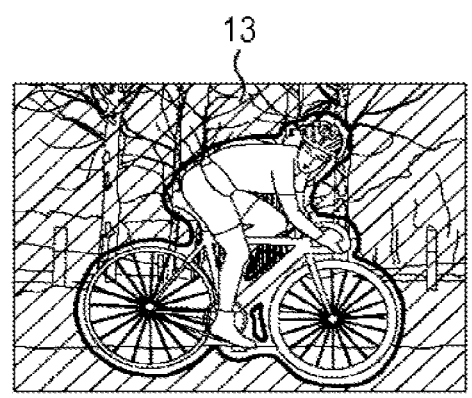

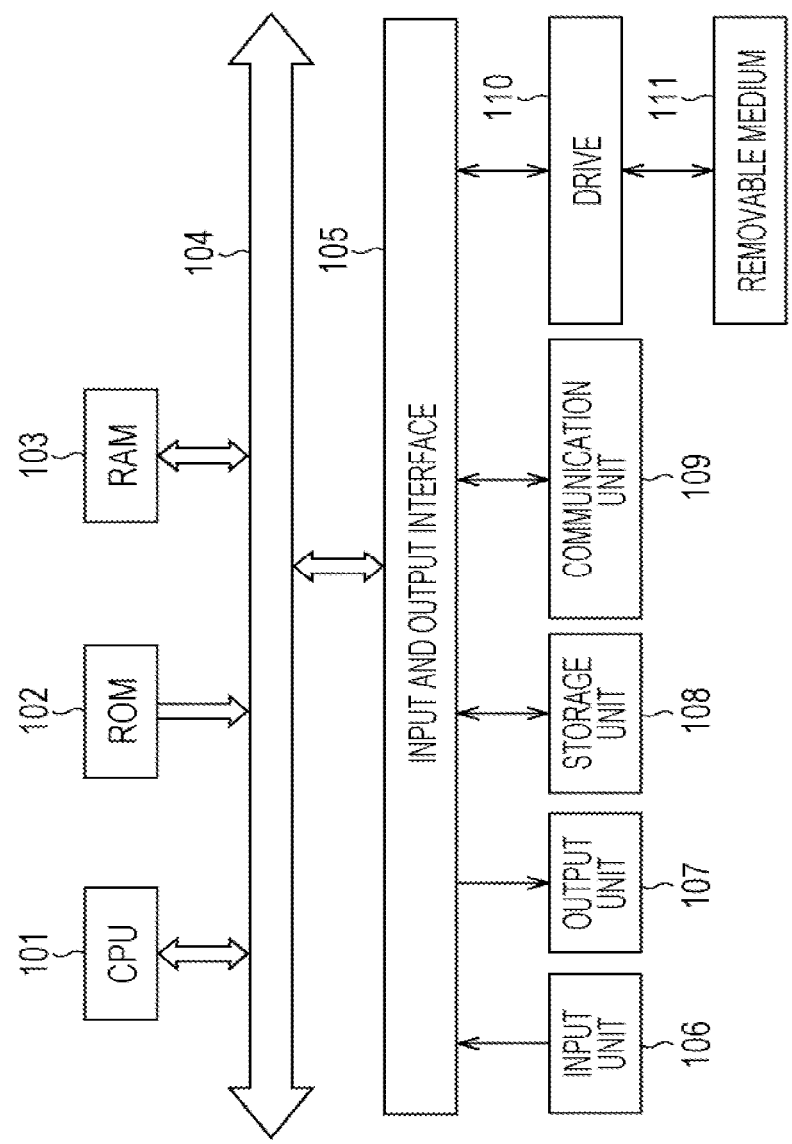

ICE PROCESSING DEVICE AND
METHOD FOR CREATING A
REPRODUCTION EFFECT BY SEPARATING
AN IMAGE INTO A FOREGROUND IMAGE
AND A BACKGROUND IMAGE

BACKGROUND

The present disclosure relates to an image processing device, an image processing method and a program, and in particular, to an image processing device, an image processing method and a program that are capable of realizing a novel reproduction effect.

A reproduction method in the related art is such that when reproducing a still image, one part of an imaging target object that is imaged into the still image is reproduced as if it were in motion.

For example, in Japanese Unexamined Patent Application Publication No. 2011-66717 is disclosed a reproduction method in which a region, one part of a sequence of images according to the passage of time, is stopped as a static display region at a predetermined time, and other regions are reproduced as dynamic display regions. However, in the technology disclosed in Japanese Unexamined Patent Application Publication No. 2011-66717, any one of an image in a region that is superimposed and an image in a region onto which the region is superimposed is stationary in terms of a position in which drawing is provided with respect to a display surface.

Furthermore, in Japanese Unexamined Patent Application Publication No. 2010-124115 is disclosed a reproduction method in which a moving image that is configured from consecutive images is used as a raw material, or relevant consecutive still images and a still image unrelated to the relevant consecutive still images are used as the raw materials, and thus one part of the raw material is reproduced as if it were in motion. However, in the technology disclosed in Japanese Unexamined Patent Application Publication No. 2010-124115, only the image that is superimposed is dynamic in terms of a position in which rendering is provided with respect to a display surface. Furthermore, an unrelated image is used in an image onto which an image is superimposed and in the image that is superimposed.

SUMMARY

Incidentally, the reproduction method is demanded by which a novel reproduction effect that is not possible with the technologies disclosed in Japanese Unexamined Patent Application Publication Nos. 2011-66717 and 2010-124115 is realized.

It is desirable to realize a novel reproduction effect.

In view of the above, the embodiments of the present technology are provided. According to an illustrative embodiment, an image processing device includes a foreground selection processing circuit to select at least one foreground image that has been separated from a source image; a background selection circuit to select at least two display background images from at least one background image that has been separated from the source image; and a combination circuit to combine the at least one selected foreground image with the at least two display background images to generate a plurality of combined images, wherein at least one of the plurality of combined images does not appear in the source image.

Accordingly, a novel reproduction effect can be realized.

BRIEF DESCRIPTION OF THE DRAWINGS

FIG. 8 is a view for describing third image processing.
FIG. 11 is a block diagram illustrating a configuration example of a computer to which the present technology is applied, according to one embodiment.

DETAILED DESCRIPTION OF EMBODIMENTS

Figure 1:
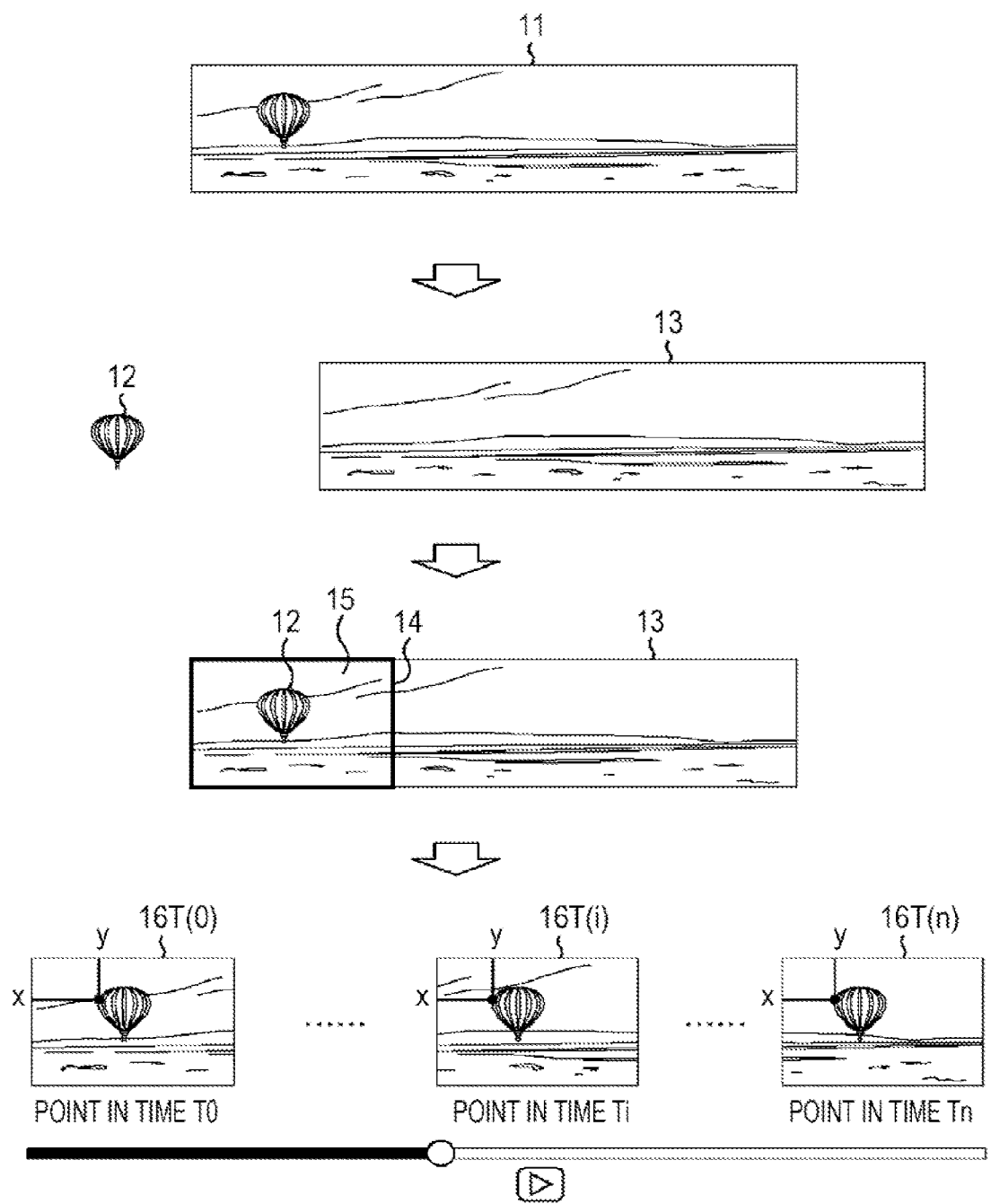
FIG. 1 is a view for describing first image processing.

Specific embodiments to which the present technology is applied are described in detail below referring to the drawings.

First, image processing to which the present technology is applied is described referring to FIG. 1.

A source material image 11 (or "raw-material image 11"), a raw material on which the image processing is performed is illustrated on the uppermost portion in FIG. 1, and a horizontally-long panoramic image having an aspect ratio is used as the raw-material image 11 in an example in FIG. 1. Then, the foreground and the background are defined with respect to an imaging target object that is imaged into the raw-material image 11, and the raw-material image 11 is separated into a foreground image and a background image, any of which is a target for scroll reproduction.

For example, as illustrated in the second portion of FIG. 1 from above, a balloon that is imaged into the raw-material image 11 is defined as a foreground image 12 and a scene that is imaged into the raw-material image 11 is defined as a background image 13, thereby separating the raw-material image 11 into the foreground image 12 and the background image 13. Then, in the example in FIG. 1, only the background image 13 is the target for scroll reproduction.

Next, as illustrated on the third portion of FIG. 1 from above, a display region 14, which specifies a region that is defined as a display target when performing the scroll reproduction, is set with respect to the background image 13 that is the target for scroll reproduction. For example, when the scroll reproduction is assumed to be performed from the left side to the right side of the background image 13, the display region 14, as illustrated, is set at the left end of the background image 13. Then, a region that is prescribed by the display region 14 is separated (or "extracted" or "cropped") as a display background image 15 from the background image 13, and a combination image 16 is generated by combining the display background image 15 and the foreground image 12 that is not defined as the target for scroll reproduction.

Then, according to the number of frames at the time of the scroll reproduction, the display region 14 is set with respect to the background image 13 in such a manner that a position of the display region 14 is gradually moved to the right and the foreground image 12 is combined with respect to each frame.

As illustrated on the fourth portion of FIG. 1 from above, the combination image 16 is generated in which the foreground image 12 is arranged all the time within the display region 14 while scrolling the background image 13. For example, in a combination image 16 T(0) at a point in time T0 when reproduction of the combination image 16 is started, the left end of the background image 13 is extracted. Then, in a combination image 16T(i) at a point in time Ti, the background image 13 at a position corresponding to the point in time Ti is extracted, and in a combination image 16T(n) at a point in time Tn when the reproduction of the combination image 16 is ended, the right end of the background image 13 is extracted. Furthermore, in the combination image 16, when combining the foreground image 12, coordinates (x, y) at which the foreground image 12 is arranged are stationary between the combination images 16T(0) to 16T(n).

By generating the total number n of frames, the combination images 16 T(0) to 16T(n) in this manner, a moving image is generated that has an effect in which the reproduction occurs as if the balloon, the foreground image 12, were displayed all the time, and the scene, the background image 13 were displayed while scrolled according to a movement of the display region 14. In other words, an effect can be obtained in which the reproduction occurs if the static imaging target object were imaged into the dynamic background.

Figure 2:
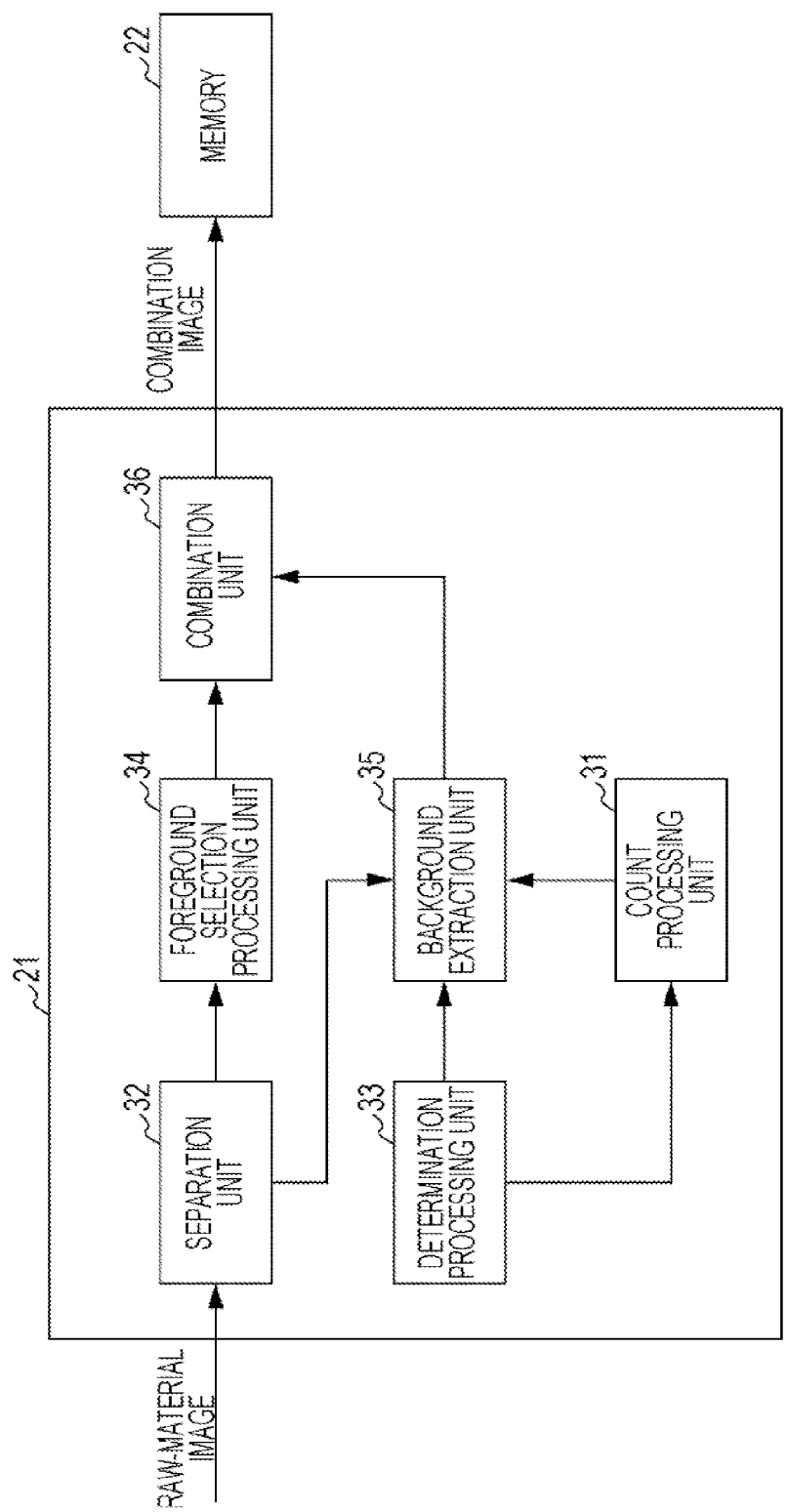
FIG. 2 is a block diagram illustrating a configuration example of an image processing device according to one embodiment, to which the present technology is applied.

Next, FIG. 2 is a block diagram illustrating a configuration example of an image processing device according to one embodiment, to which the present technology is applied.

An image processing device 21 performs the image processing on the raw-material image 11 that is input as the raw material, generates the combination image 16, and retains the result in a memory 22. The image processing device 21, as illustrated in FIG. 2, is configured to include a count processing circuit 31 (or "count processing unit" 31), a separation circuit 32 (or "separation unit" 32), a determination processing circuit 33 (or "determination processing unit" 33), a foreground selection processing circuit 34 (or "foreground selection processing unit" 34), a background extraction circuit 35 (or "background extraction unit" 35) and a combination circuit 36 (or "combination unit" 36).

The count processing circuit 31 counts a count value T(i) to count the number of frames of the combination image 16 that is generated in the image processing device 21, and performs count processing to make a comparison with the total number n of frames of the combination image 16 that are generated in the image processing device 21.

For example, an image that is recorded in a record circuit (or "record unit") not illustrated is input as the raw-material image 11 into the separation circuit 32. Then, the separation circuit 32 separates the raw-material image 11 into the foreground image 12 and the background sight image 13, supplies the foreground image 12 to the foreground selection processing section 34 and supplies the background image 13 to the background extraction circuit 35.

For example, the separation circuit 32 detects an edge of a photograph target object that is imaged into the raw-material image 11, defines a region into which the photograph target object is imaged, as the foreground image 12 and defines the other regions as the background image 13. Furthermore, for example, a user may appoint a region of the raw-material image 11 that is defined as the foreground image 12, by operating an operation circuit (or "operation unit") not illustrated. The separating circuit 32 defines the region appointed by the user as the foreground image 12 and defines the other regions as the background image 13. Furthermore, the separation circuit 32 can supplement the region into which the foreground image 12 is imaged in the background image 13, with an image adjacent to that region.

The determination processing circuit 33 performs determination processing, such as determining a size and a position of the display region 14 that is set with respect to the background image 13, or determining the total number n of frames of the combination image 16 that the count processing circuit 31 refers to in the counter processing. For example, when performing the scroll reproduction that is described referring to FIG. 1, the determination processing circuit 33 determines the size of the display region 14 in accordance with a height of the raw-material image 11. Then, the determination processing circuit 33 determines the left end of the raw-material image 11 as the first position of the display region 14 and determines the right end of the raw-material image 11 as the last position of the display region 14.

The foreground selection processing circuit 34 selects (determines) the foreground image 12 that is used as the foreground in the combination image 16. For example, when using the panoramic image as the raw-material image 11 as illustrated referring FIG. 1, because the foreground image 12 is the only one, the foreground selection processing circuit 34 selects the foreground image 12. Furthermore, for example, as described below referring to FIG. 4, when using the moving image as the raw-material image 11, the foreground selection processing circuit 34 selects the foreground image 12 that is combined into the combination image 16, from the multiple foreground images 12 that are imaged into the raw-material image 11.

The background extraction circuit 35 sets the display region 14 with respect to the background image 13 supplied from the separation circuit 32, according to the determination by the determination processing circuit 33, extracts the display background image 15 from the background image 13 based on the display region 14, and supplies the result to the combination circuit 36.

At this time, the background extraction circuit 35 sets the display region 14 to a position that is according to the count value T obtained by the count processing circuit 31. In other words, the background extraction circuit 35 sets the display region 14 to the first position that is determined by the determination processing circuit 33, according to the count value T(0), and sets the display region 14 to the last position that is determined by the determination processing circuit 33, according to the count value T(n). Then, for example, the background extraction circuit 35 sets the display region 14 that is according to the count value T(i), to an i-th position that results from equally dividing spacing between the first position and the last position of the display region 14 by the total number n of frames.

In other words, the background extraction circuit 35 extracts the display background image 15T(i) from the background image 13, based on the display region 14 that is set according to the count value T(i), and supplies the display background image 15T(i) to the combination circuit 36.

The combination circuit 36 combines the foreground image 12 that is supplied from the foreground selection processing circuit 34, in such a manner that the foreground image 12 is superimposed onto the background image 13T(i) that is supplied from the background extraction circuit 35, thereby generating the combination image 16T(i). Then, the combination circuit 36 supplies the generated combination image 16T(i) to the memory 22 and the generated combination image 16T(i) is retained in the memory 22.

The image processing device 21 is configured in this manner. The background extraction circuit 35 supplies the display background images 15T(0) to 15T(n) to the combination circuit 36, according to the count values T(0) to T(n). The combination circuit 36 generates (combines) the moving image that is made from the combination images 16T(0) to 16T(n). Therefore, by sequentially reading the combination images 16T(0) to 16T(n) out of the memory 22 and reproducing the read-out combination images, an effect can be obtained in which the reproduction occurs as if only the scene of the background image 13 were moved with the balloon, the background image 12, remaining stationary.

Figure 3:
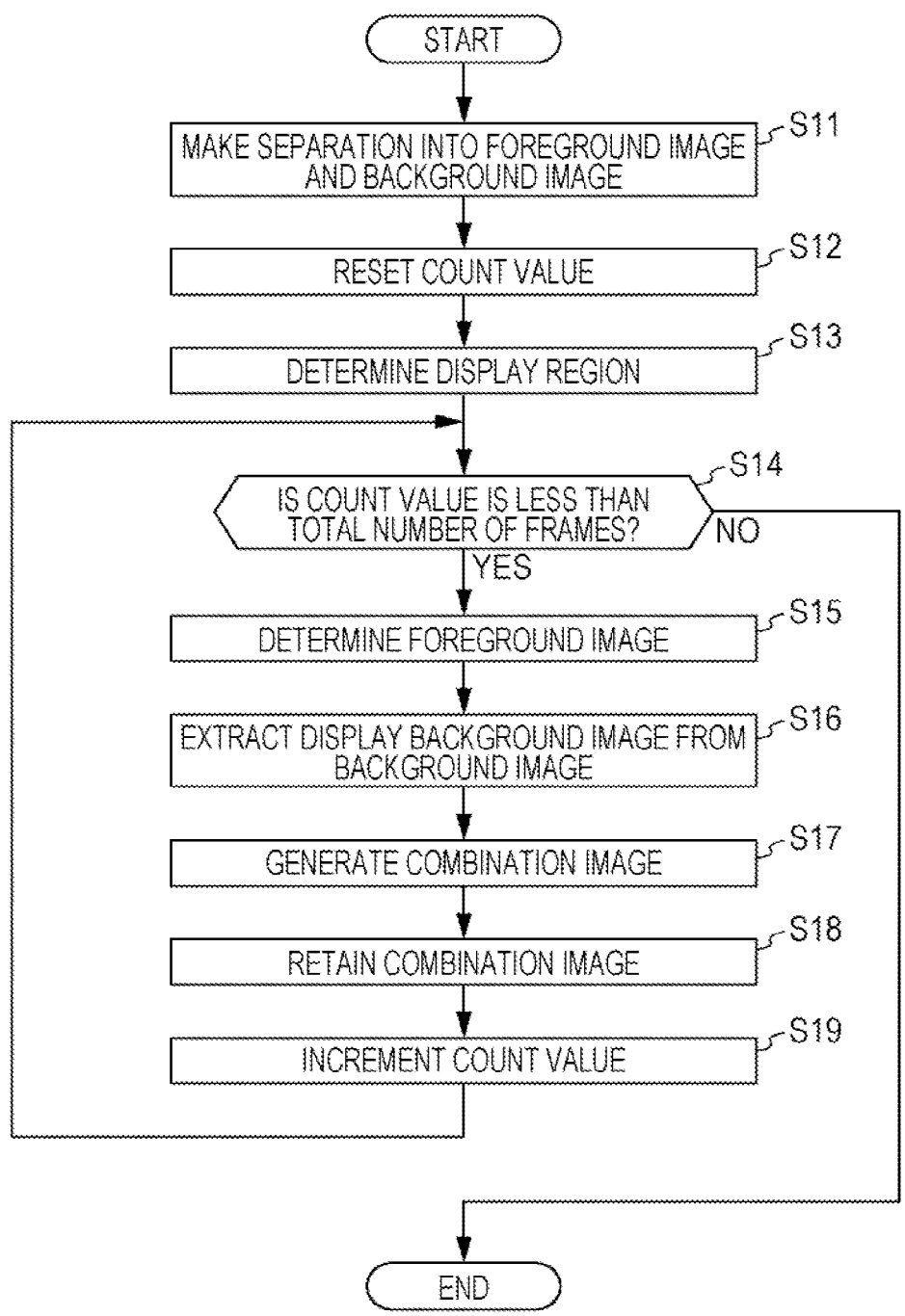
FIG. 3 is a flowchart describing the first image processing.

Next, the image processing by the image processing device 21 is described referring to a flowchart of FIG. 3.

For example, when the raw-material image 11 is supplied to the image processing device 21, the processing is started. In Step S11, the separation circuit 32 separates the raw-material image 11 into the foreground image 12 and background image 13, supplies the foreground image 12 to the foreground selection processing circuit 34, and supplies the background image 13 to the background extraction circuit 35.

In Step S12, the count processing section 31 initializes the count value T(i) to count the number of frames of the combination image 16 and sets the count value T(i) to 0.

In Step S13, the determination processing circuit 33 determines the size and the position of the display region 14 that is set with respect to the background image 13. For example, if a still image is defined as the raw material, the determination processing circuit 33 determines the size of the display region 14 in such a manner that the size of the display region 14 is smaller than the size of the background image 13.

In Step S14, the count processing circuit 31 determines whether or not the current count value T(i) is less than the total number n of frames, and if it is determined that the current count value T(i) is less than the total number n of frames (i<n), the processing proceeds to Step S15. In other words, the count processing section 31 compares the total number n of frames with the current count value T(i), and as long as the combination image 16T(i) generated at the current count value T(i) does not reach the combination image 16T(n) that is generated corresponding to the total number n of frames, the processing continues.

In Step S15, the foreground selection processing circuit 34 determines the foreground image 12 that is used as the foreground in the combination image 16.

In Step S16, the background extraction circuit 35 sets the display region 14 of which the size is determined by the determination processing circuit 33 in Step S13, to a position corresponding to the current count value T(i), with respect to the background image 13. Then, the background extraction circuit 35 extracts the display background image 15T(i) from the background image 13 according to the display region 14 and supplies the result to the combination circuit 36.

In Step S17, the combination circuit 36 combines the foreground image 12 selected by the foreground selection processing circuit 34 in Step S15 with the display background image 15T(i) extracted by the background extraction circuit 35 from the background image 13 in Step S16, thereby generating the combination image 16T(i).

In Step S18, the combination circuit 36 supplies the combination image 16T(i) generated in Step S17 to the memory 22 and the combination image 16T(i) is retained in the memory 22.

In Step S19, the count processing section 31 increments the count value T(i) only by one, and the processing returns to Step S14. Subsequently, the same processing is repeatedly performed.

Thereafter, in Step S14, if the count processing circuit 31 determines that the current count value T(i) is not less than the total number n of frames, that is, that the current count value T(i) is the total number n of frames or more (i≥n), the processing is ended.

As described above, when the still image (for example, the panoramic image) is supplied as the raw-material image 11, the image processing device 21 can generate the combination image 16 that is reproducible in such a manner that the imaging target object is imaged all the time while the scene of the still image moves. In other words, by sequentially reading the combination images 16T(0) to 16T(n) out of the memory 22 and reproducing the read-out combination images, a novel effect can be obtained in which the reproduction occurs as if only the scene of the background image 13 were moved with the balloon, the background image 12, remaining stationary.

In other words, by using the foreground image 12 and the background image 13 that are separated from the raw-material image 11, a relationship is present between the superimposed foreground image 12 and the background image 13 onto which the foreground image 12 is superimposed, and furthermore the position on which the background image 13 is displayed moves in the combination image 16. Thus, the image processing device 21 can accomplish the new reproduction effect that is different from the reproduction effect in the related art.

Moreover, in addition to performing the image processing that uses the still image as the raw-material image 11, which is described referring to FIG. 1, the image processing device 21 can perform the image processing that uses the moving image as the raw-material image 11. The imaging process that uses the still image as the raw-material image 11, which is described above is hereinafter referred to as first image processing for the sake of convenience.

Figure 4:
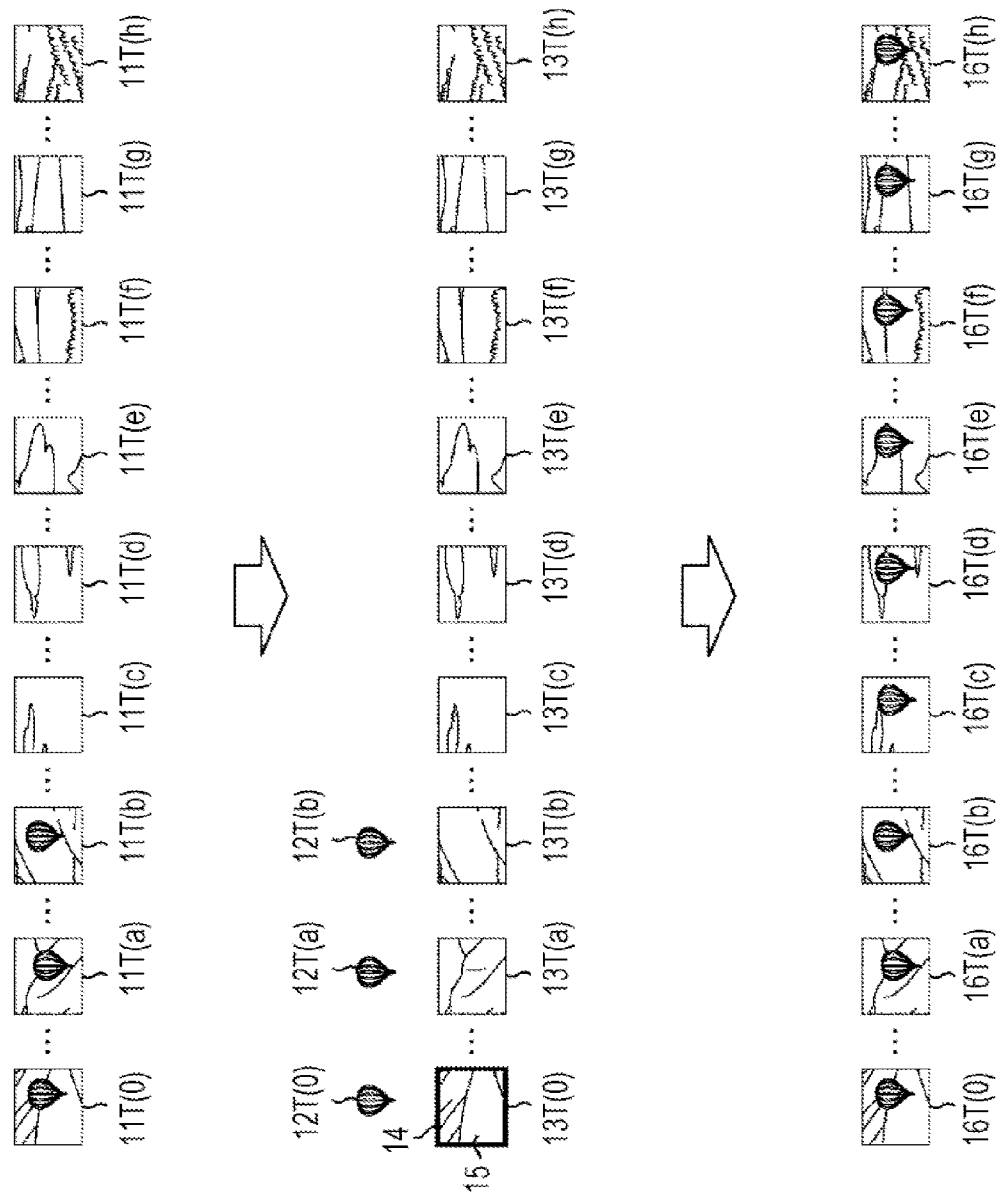
FIG. 4 is a view for describing second image processing.

Next, second image processing that uses the moving image as the raw-material image 11 in the image processing device 21 is described referring to FIG. 4.

On the uppermost portion in FIG. 4, raw-materials 11T(0) to 11T(h) are illustrated that make up the moving image, raw materials on which the image processing is performed. Then, the foreground and the background are defined with respect to the raw-material images 11T(0) to 11T(h), and the raw-material images 11T(0) to 11T(h) are separated into the foreground images and the background images.

For example, as illustrated on the second portion of FIG. 4 from above, a balloon that is imaged into the raw-material images 11T(0) and 11T(b) are defined as foreground images 12T(0) to 12T(b). Furthermore, a scene that is imaged into the raw-material images 11T(0) to 11T(h) are defined as background images 13T(0) to 13T(h). Then, the raw-material images 11T(0) to 11T(b) into which the balloon is imaged are separated into the foreground images 12T(0) to 12T(b) and the background images 13T(0) to 13T(b). Moreover, raw-material images 11T(c) to 11T(h) into which the balloon is not imaged, as they are, are used as background images 13T(c) to 13T(h).

Furthermore, the display region 14 is determined as having the same size as the background images 13T(0) and 13T(h), and all regions of each of the background images 13T(0) to 13T(h) are displayed.

Then, the foreground images 12T(0) to 12T(b) are combined with the background images 13T(0) to 13T(h) in such a manner that the foreground images 12T(0) to 12T(b) are superimposed onto the background images 13T(0) to 13T(h). Here, the last foreground image 12T(b) of the foreground images 12T(0) to 12T(b) is combined with respect to the background images 13T(c) to 13T(h). In other words, the foreground image 12T(b) is used as being of a still image. Moreover, a position of the foreground image 12T(b) may is properly moved that is superimposed onto the background images 13T(c) to 13T(h).

As illustrated on the third portion of FIG. 4 from above, this makes it possible to generate combination images 16T(0) to 16T(h) in which the foreground image 12 is arranged all the time with respect to the background images 13T(c) to 13T(h).

Furthermore, as a modification example of the second image processing, the foreground image into which the imaging target object is imaged most excellently among the foreground images 12T(0) to 12T(b) may be combined with respect to the background images 13T(c) to 13T(h). For example, no blurring, no shaking, big smile, no closed eyes, brightness and the like are used as criteria for determining the best imaging of the imaging target object into the foreground image. Furthermore, the best imaging of the imaging target object may be automatically selected or may be selected by a user through the use of information on the foreground image 12 itself and information applied to the foreground image 12. Regarding selection of the foreground image based on brightness, it should be noted that the foreground image may be selected according to a level of brightness that provides the best foreground image, so as to avoid selection of an image with a brightness that is too high or too low.

Moreover, since the background images 13T(c) to 13T(h) are not stationary, that is, since the background moves in the raw-material images 11T(0) to 11T(b), the effect in which the reproduction occurs as if the static imaging target object were imaged into the dynamic background can be obtained in the second image processing.

Figure 5:
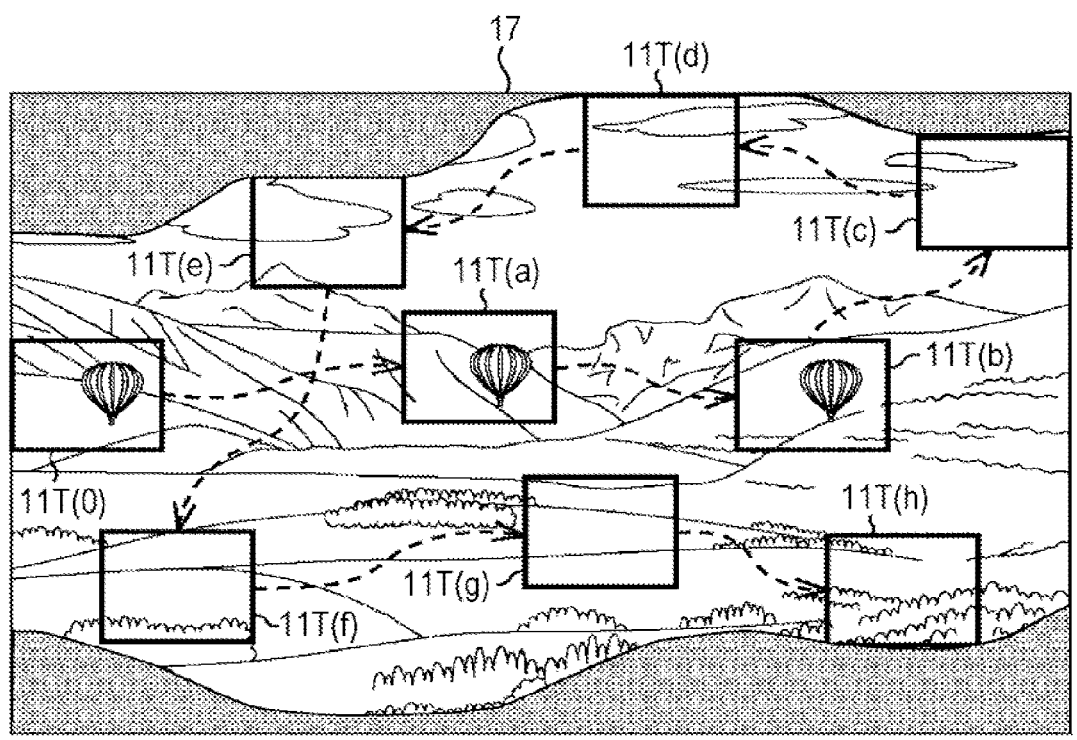
FIG. 5 is an image, sufficiently large in view angle, which is made from multiple sheets of image that makes up a moving image.

At this point, in FIG. 5, an image is illustrated in which the raw-material images 11T(0) to 11T(h) are arranged two-dimensionally and are displayed.

The raw-material images 11T(0) to 11T(h) are matched to the image, and the raw-material images 11T(0) to 11T(h) are combined with regions of the image with which the raw-material images 11T(0) to 11T(h) agree, respectively, in an overlapping manner. Moreover, a technology, as illustrated in FIG. 5, which generates the image 17, sufficiently large in view angle, from the multiple sheets of image that make up the moving image is disclosed in detail, for example, in Japanese Unexamined Patent Application Publication No. 2009-077363 and US Patent Application Publication No. 2010/0066860, both filed by the applicant of the present application, and both hereby incorporated by reference herein.

The background images 13T(0) to 13T(h) are the moving images of which an image capture position is not stationary, but the image that is sufficiently as large in view angle as the image 17 can be generated by using the background images 13T(0) to 13T(h). Moreover, the image 17 is not only generated from the multiple sheets of image that make up the moving image, but the image 17 may also be created by using the still images, obtained by consecutive shooting, as the raw materials.

Figure 6:
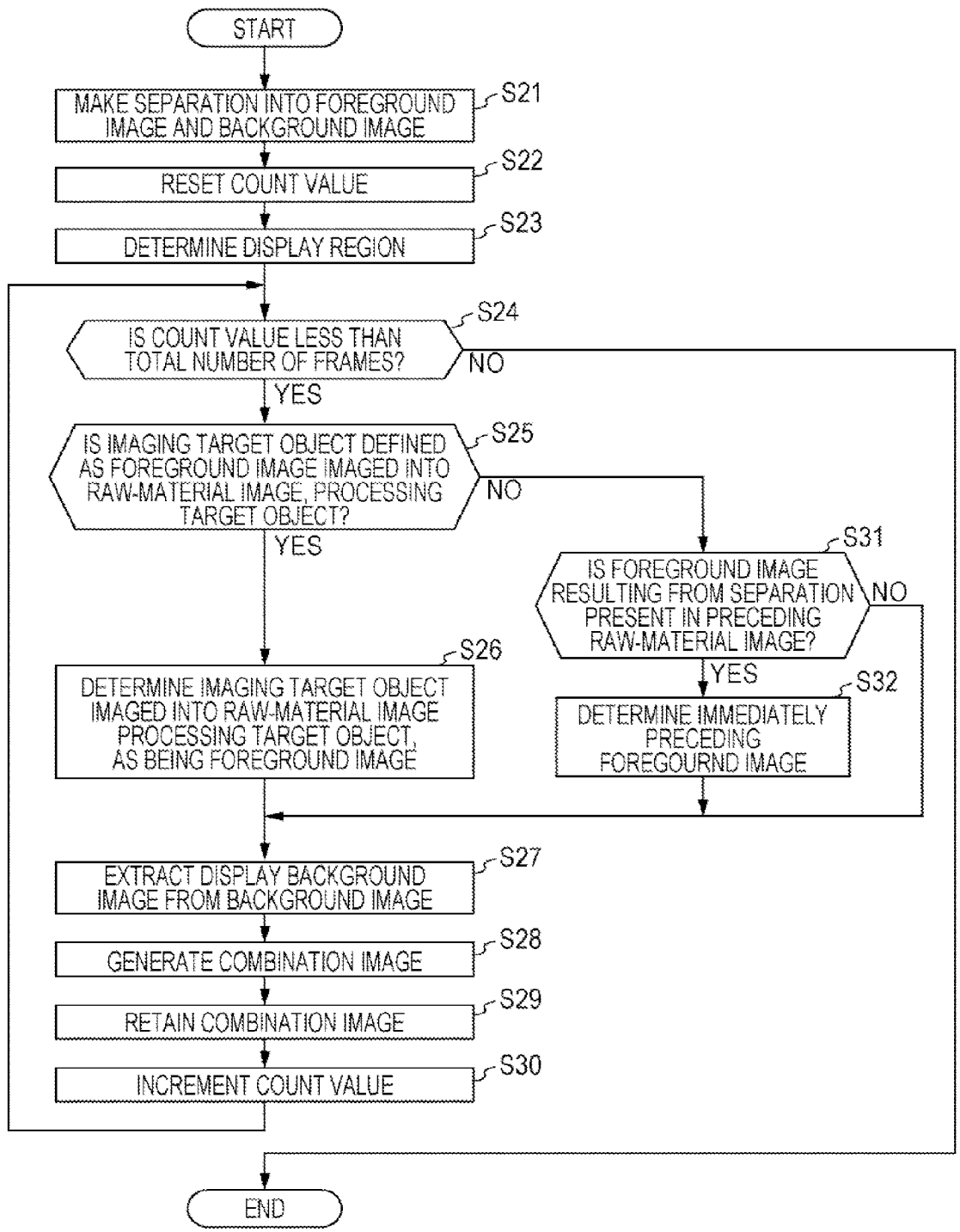
FIG. 6 is a flowchart describing second image processing.

Next, the second image processing by the image processing device 21 is described referring to a flowchart of FIG. 6.

For example, when the raw-material images 11T(0) to 11T(h) that make up the moving image are provided to the image processing device 21, the processing is started. In Step S21, the separation circuit 32 separates the raw-material images 11T(0) to 11T(b), into which the balloon is imaged, into the foreground images 12T(0) to 12T(b) and the background images 13(0) to 13T(b). Then, the separation circuit 32 supplies the foreground image 12T(0) to 12T(b) to the foreground selection processing circuit 34 and supplies the background image 13T(0) to 13T(b) to the background extraction circuit 35. Furthermore, the separation circuit 32 supplies the raw-material images 11T(c) to 11T(h), as they are, into which the balloon is not imaged, as the background image 13T(c) to 13T(h) to the background extraction circuit 35.

In Step S22, the count processing section 31 initializes the count value T(i) to count the number of the frames of the combination image 16 and sets the count value T(i) to 0.

In Step S23, the determination processing circuit 33 determines the size and the position of the display region 14 that is set with respect to the background images 13T(0) to 13T(h). For example, if the moving image is defined as the raw material, the determination processing circuit 33 determines the size and the position of the display region 14 in such a manner that the display region 14 agrees with each of the background images 13T(0) to 13T(h) in terms of size and position, that is, in such a manner that all regions of each of the background images 13T(0) to 13T(h) are displayed.

It should be noted that Step 23 can be bypassed in the event that the source image is a moving image. For example, when the source image is a moving image, one or more frames of the source image can be used as background images directly, without any need for extraction. Therefore, in such a case, there is no need to set a display region for use in extraction.

In Step S24, the count processing circuit 31 determines whether or not the current count value T(i) is less than the total number n of frames, and if it is determined that the current count value T(i) is less than the total number h of frames (i<h), the processing proceeds to Step S25.

In step S25, the foreground selection processing circuit 34 determines whether or not the imaging target object that is defined as the foreground image 12T(i) is imaged into the raw-material image 11T(i), a processing target object that is according to the current count value T(i). For example, in Step S21, if the raw-material image 11T(i) is separated into the foreground image 12T(i) and the background image 13T(i), the foreground selection processing circuit 34 determines that the imaging target object defined as the foreground image 12T(i) is imaged into the raw-material image 11T(i), the processing target object.

In Step S25, the processing proceeds to Step 26 if the foreground selection processing circuit 34 determines that the imaging target object defined as the foreground image 12T(i) is imaged into the raw-material image 11T(i), the processing target object. In Step S26, the foreground selection processing circuit 34 selects the imaging target object that is imaged into the raw-material image 11T(i), the processing target object, that is, the foreground image 12T(i) separated from the raw-material image 11T(i), and determines the selected foreground image 12T(i) as being combined into the combination image 16T(i).

In Step 27, the background extraction circuit 35 extracts the display background image 15T(i) from the background image 13T(i) according to the display region 14 and supplies the result to the combination circuit 36. Moreover, in the second image processing, the display region 14 is determined in Step S23 in such a manner as to agree with the background image 13T(i). Because of this, the background extraction circuit 35 supplies all regions of the background image 13T(i) as the display background image 15T(i) to the combination circuit 36 and supplies the background image 13T(i), as it is, as the background 15T(i) to the combination circuit 36.

In Step S28, the combination circuit 36 combines the foreground image 12T(i) selected by the foreground selection processing circuit 34 in Step S26 with the display background image 15T(i) supplied from the background extraction circuit 35 in Step S27, thereby generating the combination image 16T(i).

In Step S29, the combination circuit36 supplies the combination image 16T(i) generated in Step S28 to the memory 22, for retention in there.

In Step S30, the count processing section 31 increments the count value T(i) only by one, and the processing returns to Step S24. From Step S24 onwards, the same processing is repeatedly performed.

On the other hand, in Step S25, the processing proceeds to Step 31 if the foreground selection processing circuit 34 determines that the imaging target object defined as the foreground image 12T(i) is not imaged into the raw-material image 11T(i), the processing target object.

In Step S31, the foreground selection processing circuit 34 determines whether or not the foreground image 12 is separated in the raw-material images 11T(0) to 11T(i−1) before the raw-material image 11T(i), the processing target object.

In Step S31, if the foreground selection processing circuit 34 determines that the foreground image 12 is separated in the raw-material images 11T(0) to 11T(i−1) before the raw-material image 11T(i), the processing target object, the processing proceeds to S32. In Step S32, the foreground selection processing circuit 34 determines that the foreground image 12 that is separated from the immediately preceding raw-material image 11, among the foreground images 12 that are separated from the raw-material images 11T(0) to 11T(i−1), is combined into the combination image 16T(i).

After performing the processing in Step S32, the processing proceeds to Step S27. From Step S27 onwards, the processing described above is performed.

On the other hand, in Step S31, if the foreground selection processing circuit 34 determines that the foreground image 12 is not separated in the raw-material images 11T(0) to 11T(i−1) before the raw-material image 11T(i), the processing target object, the processing proceeds to Step S27 without selecting the foreground image 12 that is combined into the combination image 16T(i). From Step S27 onwards, the processing described above is performed. That is, in this case, because the imaging target object defined as the foreground image 12 is not imaged, exception processing is performed that does not combine the foreground image 12.

Thereafter, in Step S24, if the count processing circuit 31 determines that the current count value T(i) is not less than the total number h of frames, that is, that the current count value T(i) is the total number h of frames or more (i≥h), the processing is ended.

As described above, when the moving image is supplied as the raw-material image 11, the image processing device 21 can generate the combination image 16 that is reproducible in such a manner that the imaging target object is imaged all the time against the background of the moving image. In other words, by sequentially reading the combination images 16T(0) to 16T(h) out of the memory 22 and reproducing the read-out combination images, the novel effect can be obtained in which the reproduction occurs as if the balloon, the foreground image 12 were displayed all the time, and only the scene, the background image 13 were moved.

Moreover, the image processing device 21, as described above, may combine the foreground image into which the imaging target object is imaged most excellently among the foreground images 12T(0) to 12T(b), with respect to the background images 13T(c) to 13T(h).

Figure 7:
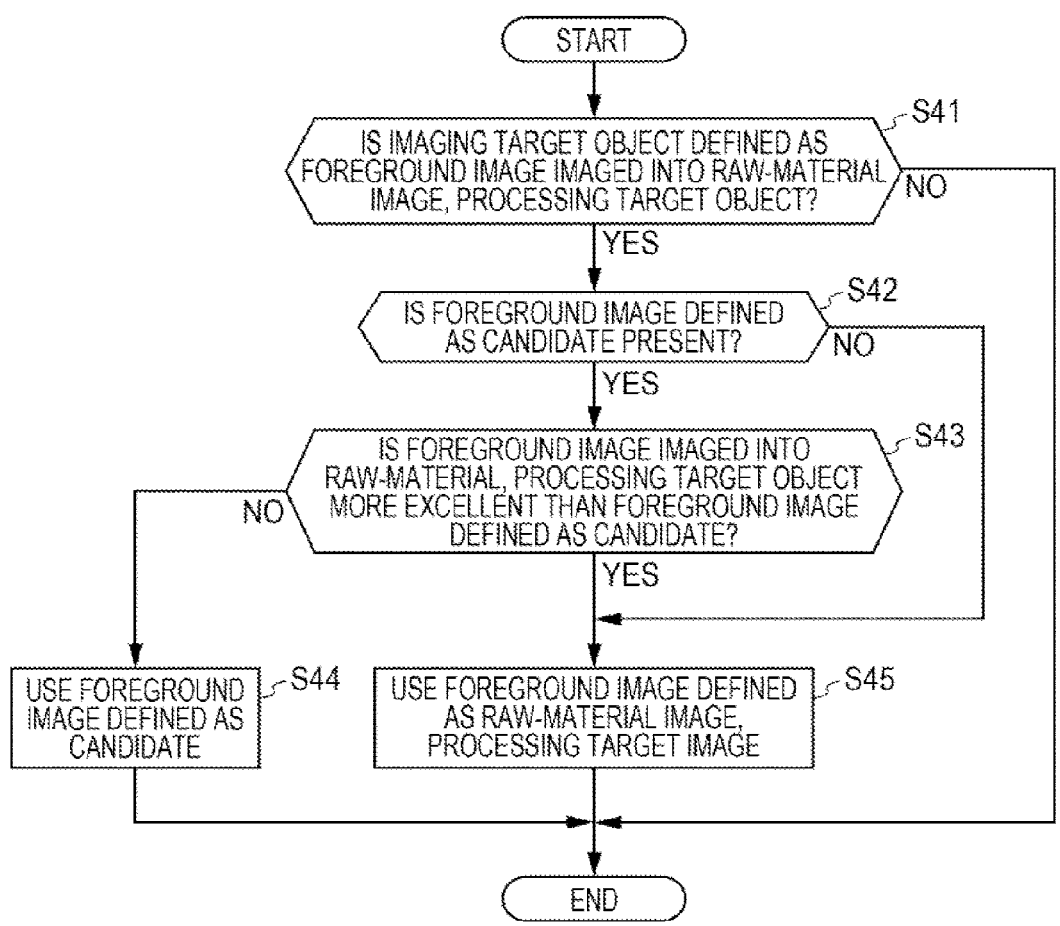
FIG. 7 is a flowchart describing a modification example of the second image processing.

That is, a modification example of the second image processing by the image processing device 21 is described referring to a flowchart of FIG. 7. Moreover, the flowchart of FIG. 7 illustrates processing performed from Step S24 to before Step S27 in FIG. 6.

That is, if the count processing section 31 determines in Step S24 in FIG. 6 that the current count value T(i) is less than the total number h of frames (i<h), the processing proceeds to Step S41.

In step S41, the foreground selection processing circuit 34 determines whether or not the imaging target object that is defined as the foreground image 12T(i) is imaged into the raw-material image 11T(i), a processing target object that is according to the current count value T(i), in the same manner as in Step S25 in FIG. 6.

In Step S41, if the foreground selection processing circuit 34 determines that the imaging target object defined as the foreground image 12T(i) is imaged into the raw-material image 11T(i), the processing target object, the processing proceeds to Step 42. In step S42, the foreground selection processing circuit 34 determines whether or not the foreground image 12 is present, that is a candidate that is combined into the combination image 16T(i).

In Step S42, the processing proceeds to Step S43 if the foreground selection processing circuit 34 determines that the foreground image 12 is present that is the candidate that is combined into the combination image 16T(i). In Step S43, the foreground selection processing circuit 34 determines whether or not the imaging target object, the foreground image 12T(i) that is imaged into the raw-material image 11T(i), the processing target object, is more excellent, that is, is better in imaging, than the imaging target object, the foreground image 12 that is the candidate.

In Step S43, the processing proceeds to Step S44 if it is determined that the imaging target object, the foreground image 12T(i) that is imaged into the raw-material image 11T(i), the processing target object, is not more excellent than the imaging target object, the foreground image that is the candidate. In Step S44, the foreground selection processing circuit 34 selects the foreground image 12, which is the candidate, as being combined into the combination image 16T(i).

On the other hand, the processing proceeds to Step S45 if it is determined in Step S43 that the imaging target object, the foreground image 12T(i) that is imaged into the raw-material image 11T(i), the processing target object, is more excellent than the imaging target object, the foreground image 12 that is the candidate, or if it is determined in Step S42 that the foreground image 12, the candidate that is combined into the combination image 16T(i), is not present. In Step S45, the foreground selection processing circuit 34 selects the foreground image 12T(i) that is imaged into the raw-material image 11T(i), the processing target object, as being combined into the combination image 16T(i).

Then, after performing the processing in Steps S44 or S45, or in Step S41, if it is determined that the imaging target object defined as the foreground image 12T(i) is not imaged into the raw-material image 11T(i), the processing target object, the processing proceeds to Step 27 in FIG. 6.

As described above, the image processing device 21 compares the imaging target object, the foreground image 12T(i), which is imaged into the raw-material image 11T(i), the processing target object, and the imaging target object, the foreground image 12 that is the candidate. Thus, the image processing device 21 can generate the combination image 16 by using the foreground image 12 that turns out to be a more excellent imaging target object.

Next, third image processing that is performed in the image processing device 21 is described referring to a flowchart of FIG. 8.

On the uppermost portion in FIG. 8, a leading frame that makes up the moving image is illustrated as the raw-material image 11. Furthermore, as illustrated by a region indicated by hatching in the second portion of FIG. 8 from above, a person and a bicycle that are imaged into the raw-material image 11 are defined as the foreground image 12 and are separated from the raw-material image 11. Furthermore, as illustrated by a region indicated by the hatching in the third portion of FIG. 8 from above, a scene that is imaged into the raw-material image 11 is defined as the background image 13 and is separated from the raw-material image 11. Furthermore, in the same manner as in the second image processing, the display region 14 is determined as having the same size as the background image 13, and all regions of the background image 13 are displayed.

Then, in the third image processing, the combination image is generated in such a manner that both of the foreground image 12 and the background image 13 move and the foreground image 12 and the background image 13 are displayed at fixed coordinates. At this time, for example, an effect in which the reproduction occurs as if flow of the background image 13 over time were different from flow of the foreground image 12 over time can be obtained by changing a reproduction speed of the background image 13 relative to a reproduction speed of the foreground image 12. For example, when the foreground image 12 is reproduced at the same reproduction speed as the raw-material image 11, and the background image 13 is reproduced at double the reproduction speed at which the raw-material image 11 is reproduced, the combination image in which the background image 13 moves is generated as if the foreground image 12 moved at the double speed. That is, when a multiplication factor of the reproduction speed of the background image is doubled, the foreground image appears to move at double speed. One way to control the reproduction speed of the foreground image is by controlling the rate of reproduction of the image frames making up the foreground image. Similarly, one way to control the reproduction speed of the background image is by controlling the rate of reproduction of the image frames making up the background image. Thus, for example, to reproduce the foreground image at a different speed from the background image, the reproduction frame rate of the foreground image may be set different from the reproduction frame rate of the background image.

Figure 9:
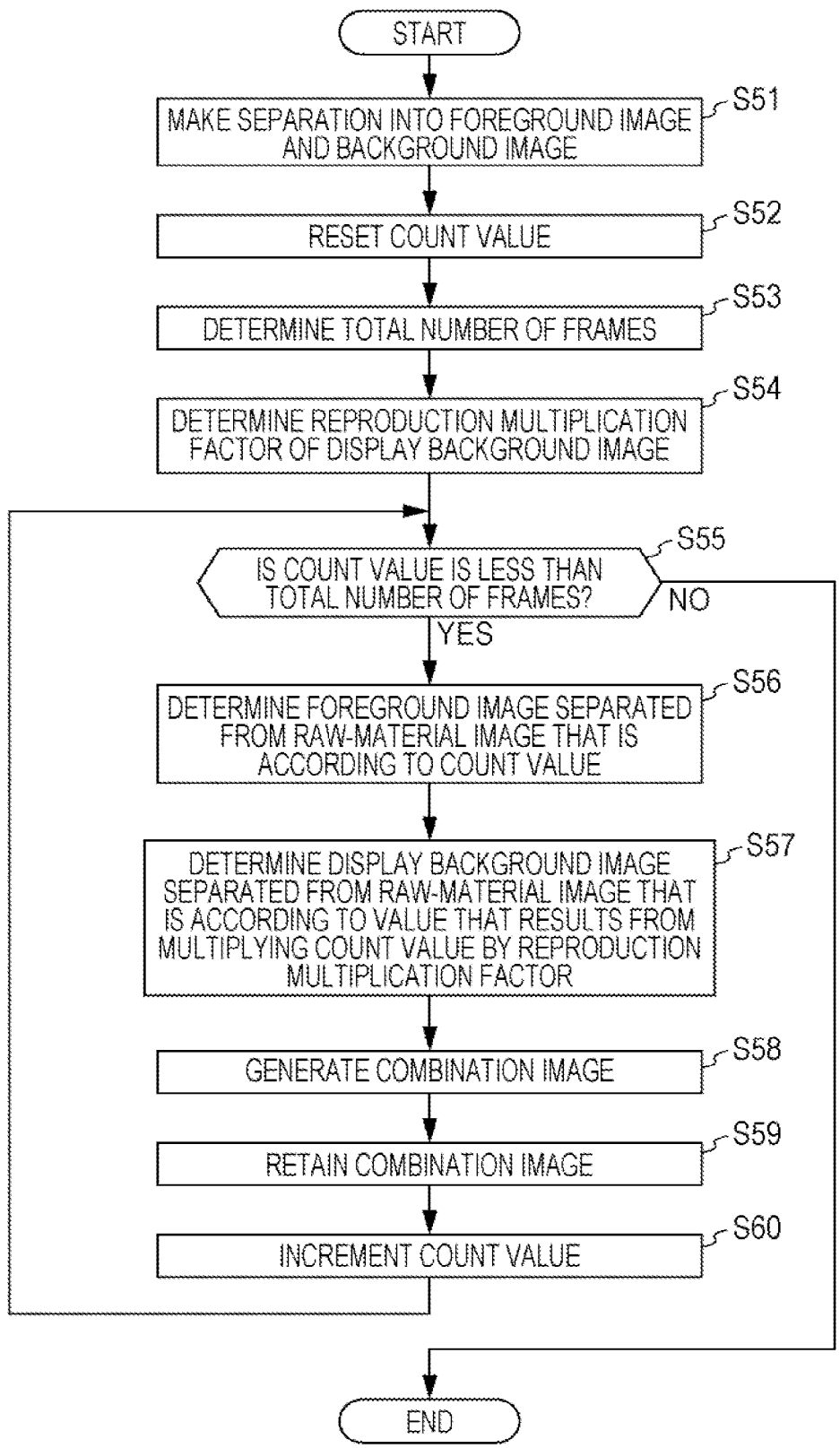
FIG. 9 is a flowchart describing the third image processing.

Next, the third image processing by the image processing device 21 is described referring to a flow chart of FIG. 9.

For example, processing is started that supplies the first frame, which makes up the moving image, as the raw-material image 11 to the image processing device 21. In Step S51, the separation circuit 32 starts the processing that separates the raw-material image 11 into the foreground image 12 and the background sight image 13, supplies the foreground image 12 to the foreground selection processing section 34 and supplies the background image 13 to the background extraction circuit 35. Furthermore, frames making up the moving image are sequentially supplied to the separation circuit 32, and the separation circuit 32 sequentially separates the frames as the raw-material image 11.

In Step S52, the count processing section 31 initializes the count value T(i) to count the number of the frames of the combination image 16 and sets the count value T(i) to 0.

The determination processing circuit 33 determines the total number N of frames of the moving image that is output, in Step S53 and determines a reproduction multiplication factor a of the display background image 15 (all regions of the background image 13 if the display region 14 is determined as having the same size as the background image 13) in Step S54. Moreover, the total number N of frames and the reproduction multiplication factor a, for example, may be input based on the reproduction effect that a user wants and may be determined according to the input of the reproduction effect.

In Step S55, the count processing circuit 31 determines whether or not the current count value T(i) is less than the total number N of frames, and if it is determined that the current count value T(i) is less than the total number N of frames (i<N), the processing proceeds to Step S56.

In Step S56, the foreground selection processing circuit 34 selects the foreground image 12T(i) that is separated from the raw-material 11T(i) that is according to the current count value T(i), and determines the selected foreground image 12T(i) as being combined into the combination image 16T(i).

In Step S57, the foreground selection processing circuit 35 selects the background image 13T(i×a) that is separated from the raw-material 11T(i×a) that is according to a value that results from multiplying the current count value T(i) by the reproduction multiplication factor a, and determines the selected background image 13T(i×a) as being combined into the combination image 16T(i).

In Step S58, the combination circuit 36 combines the foreground image 12T(i) determined by the foreground selection processing circuit 34 in Step S56 with the display background image 13T(i×a) determined by the background extraction circuit 35 in Step S57, thereby generating the combination image 16T(i). At this time, the combination circuit 36 fixes a position, in which the foreground image 12T(i) is superimposed on the background image 13T(i×a), to the same position each time.

In Step S59, the combination circuit 36 supplies the combination image 16T(i) generated in Step S58 to the memory 22, for retention in there, and generates the moving image as a result of the combination.

In Step S60, the count processing section 31 increments the count value T(i) only by one, and the processing returns to Step S55. From Step S55 onwards, the same processing is repeatedly performed.

Thereafter, the processing is ended in Step S55 if the count processing circuit 31 determines that the current count value T(i) is not less than the total number N of frames, that is, that the current count value T(i) is the total number N of frames or more (i≥N).

As described above, when the moving image is supplied as the raw-material image 11, the image processing device 21 can generate the combination image 16 that is reproducible in such a manner that the imaging target object that is reproduced at the same reproduction speed is imaged all the time against the background that is reproduced at the reproduction multiplication factor a. In other words, an effect in which the reproduction occurs as if only the background were fast forwarded can be obtained by sequentially reading the frames making up the combination image 16 out of the memory 22 and reproducing the read-out frames.

The reproduction multiplication factor a of the background image 13 here is a multiplication factor for the reproduction speed of the moving image that is used as the raw-material, and the multiplication factor is not limited to integer multiplication. Furthermore, if the reproduction multiplication factor a of the background image 13 is determined as a value of less than 1, the background image 13 is reproduced at the speed equal to or less than that of the foreground image 12, and a reproduction effect, like so-called slow reproduction, can be obtained. For example, interpolation can be performed on the foreground image or source image, and the interpolated images can be combined with the images which correspond to the reduced speed background image. Furthermore, the background image 13 may be reproduced at the same reproduction speed, and the foreground image 12 may be reproduced at the reproduction speed corresponding to the reproduction multiplication fact a. In other words, the reproduction speed is set with respect to each of the foreground image 12 and the background image 13, and the combination image is generated in such a manner that the reproduction is performed at each of the reproduction speeds.

Moreover, each of the first to third image processing is one of the examples. The combination image 16 may be generated in such a manner that only the foreground moves with the background remaining stationary. The combination image 16 may be generated in such a manner that only the background moves with the foreground remaining stationary. Furthermore, the combination image 16 may be generated in such a manner that the foreground and the background move individually.

Figure 10:
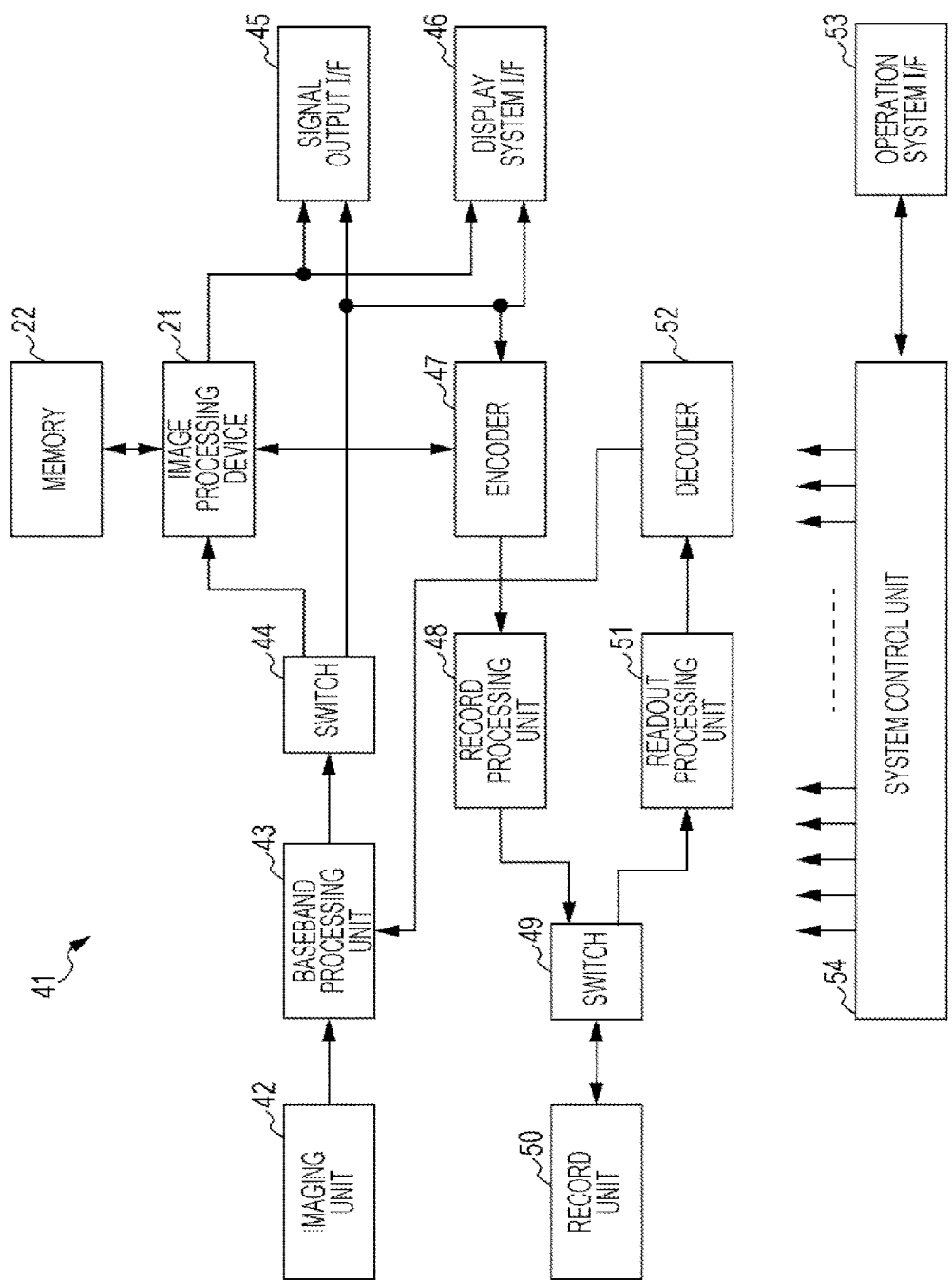
FIG. 10 is a block diagram illustrating a configuration example of a digital video camera.

Next, FIG. 10 is a block diagram illustrating a configuration example of a digital video camera equipped with the image processing device 21.

As illustrated in FIG. 10, in addition to the image processing device 21 and the memory 22 in FIG. 2, a digital video camera 41 is configured to include an imaging circuit 42 (or "imaging unit" 42), a baseband processing circuit 43 (or "baseband processing unit" 43), a switch 44, a signal output interface (I/F) 45, a display system I/F 46, an encoder 47, a record processing circuit 48 (or "record processing unit" 48), a switch 49, a record circuit 50 (or "record unit" 50), a readout processing circuit 51 (or "readout processing unit" 51), a decoder 52, an operation system I/F 53 and a system control circuit 54 (or "system control unit" 54).

Baseband processing is performed on an image captured by the imaging circuit 42 in the baseband processing circuit 43, and the resulting image is supplied to the image processing circuit 21 through the switch 44 and is output through the signal output I/F 45 and the display system I/F 46. If the image processing as described above is performed, the image is supplied to the image processing device 21, and the image processing device 21 performs the image processing on the image as the raw-material image 11.

The image processing device 21 outputs the combination image 16, obtained as a result of the image processing, to an external apparatus through the signal output I/F 45 or display a display apparatus (not illustrated) through the display system I/F 46. Furthermore, the image processing device 21 supplies the combination image 16 to the encoder 47 to encode the combination image 16, and the combination image 16 encoded by the encoder 47 is recorded by the record processing circuit 48 in the record circuit 50 through the switch 49.

Furthermore, the readout processing circuit 51 reads out the image recorded in the record circuit 50 through the switch 49, the read-out image is supplied to the decoder to decode the read-out image, and the decoded image is supplied to the baseband processing circuit 43. Then, when the resulting image is supplied to the image processing device 21 through the switch 44, the processing device 21 performs the image processing on the supplied image as the raw-material image 11.

Furthermore, operation of an operation circuit (or "operation unit") (not illustrated) by the user is provided to the system control circuit 54 through the operation system I/F 53, and the system control circuit 54 performs control on each block that makes up the digital video camera 41 according to the operation by the user.

In the digital video camera 41 that is configured in this manner, the image processing device 21 can perform the image processing, described above, on the image captured by the imaging circuit 42 or the image already recorded in the record circuit 50 as the raw-material image 11.

Furthermore, in addition to the digital video camera 41, the present technology can be applied to a mobile terminal equipped with a camera, and the image processing performed by the image processing device 21 may be provided to the mobile terminal as an application to perform the image processing in the mobile terminal. Furthermore, the image recorded by the mobile terminal may be transmitted to an application server (a computer), not illustrated, over a network, and the mobile terminal may receive and reproduce the result of the image processing performed in the application server.

Moreover, each processing that is described referring to the flowcharts described above is not necessarily performed in chronological order of the description in the flowchart, and includes the processing that is performed in parallel or individually (for example, parallel processing or processing by an object). Furthermore, a program may be one that is executed by a single CPU and may be one that is executed by the multiple CPUs using distributed processing.

Furthermore, a sequence of processing described above (an information processing method) can be executed in hardware and can be executed in software. If the sequence of processing is executed through the use of software, the program making up that software is installed, from a program recording medium on which the program is recorded, into a computer that is built into dedicated hardware or, for example, into a general purpose personal computer that, when various programs are installed, can execute various functions.

FIG. 11 is a block diagram illustrating a configuration example of the hardware of the computer that executes the sequence of processing described above using the program.

In the computer, a central processing unit (CPU) 101, a read only memory (ROM) 102, a random access memory (RAM) 103 are connected to one another through a bus 104.

An input and output interface 105 is connected to the bus 104. To the input and output interface 105, are connected an input device 106 that is made from a keyboard, a mouse, or a microphone, an output circuit 107 (or "output unit" 107) that is made from a display or a speaker, a storage circuit 108 (or "storage unit" 108) that is made from a hard disk or a nonvolatile memory, a communication circuit 109 (or "communication unit" 109) that is made from a network interface, and a drive 110 that drives a removable medium 111 such as a magnetic disk, an optical disk, an optical magnetic disk, or a semiconductor memory.

In the computer that is configured as described above, the CPUT 101 loads the program that is stored, for example, in the storage circuit 108, onto the RAM 103 through the input and output interface 105 and the bus 104 in order to execute the program. Thus, the sequence of processing described above is performed.

The program executed by the computer (the CPU 101) is recorded in the removable medium 111 that is a package medium that is made from, for example, the magnetic disk (including a flexible disk), the optical disk (compact disk-read only memory (CD-ROM), a digital versatile disk (DVD), and the like), the optical magnetic disk, or the semiconductor memory, or is provided via wireless or cable transmission medium such as a local area network, the Internet, and digital satellite broadcasting.

Then, the program can be installed into the storage circuit 108 through the input and output interface 105 by inserting the removable medium 111 into the drive 110. Furthermore, the program can be received with the communication circuit 109 through the cable or wireless transmission medium and be installed on the storage circuit 108. In addition, the program can be installed in advance in the ROM 102 or the storage circuit 108.

Moreover, the present technology can have the following configurations.

(1) An image processing device, including a foreground selection processing circuit to select at least one foreground image that has been separated from a source image; a background selection circuit to select at least two display background images from at least one background image that has been separated from the source image; and a combination circuit to combine the at least one selected foreground image with the at least two display background images to generate a plurality of combined images, wherein at least one of the plurality of combined images does not appear in the source image.

(2) The device as recited in (1), further including a separation circuit to separate the source image into the at least one foreground image and the at least one background image.

(3) The device as recited in (1), wherein the source image is a still image.

(4) The device as recited in (1), wherein the source image is a moving image.

(5) The device as recited in (1), wherein the source image is a still image formed by a plurality of images.

(6) The device as recited in (1), wherein the plurality of combined images make up a moving image.

(7) The device as recited in (1), wherein the at least two display background images are each a portion of a still background image.

(8) The device as recited in (1), wherein the at least two display background images are images included in a series of images that make up a moving image.

(9) The device as recited in (1), wherein the foreground selection circuit selects a most recently selected foreground image as a currently selected foreground image.

(10) The device as recited in (1), wherein the foreground selection circuit selects a best foreground image as a currently selected foreground image.

(11) The device as recited in (1), wherein the foreground selection circuit selects a foreground image based on user input.

(12) The device as recited in (1), wherein the foreground selection circuit selects a foreground image automatically.

(13) The device as recited in (12), wherein the foreground selection circuit selects at least one foreground image based on at least one criteria selected from the group consisting of whether or not the foreground image is blurred, whether or not a subject of the foreground image is smiling, whether or not a subject of the foreground image has closed eyes, and the brightness of the foreground image.

(14) The device as recited in (1), further including a determination processing circuit for determining at least one of a size and a position of a display region for use in selecting a display background image from the at least one background image.

(15) The device as recited in (1), wherein the source image is a moving image and the plurality of combined images make up a moving image.

(16) The device as recited in (1), further including a memory for storing the plurality of combined images.

(17) The device as recited in (1), wherein the total number of the plurality of combined images is a predetermined number.

(18) The device as recited in (17), further including a determination processing circuit for determining, based on the predetermined number, at least one of a size and a position of a display region for use in selecting a display background image from the at least one background image.

(19) The device as recited in (1), wherein the device is incorporated in a camera, the camera including an imaging circuit and a display.

(20) The device as recited in (1), wherein the source image is a moving image, at least two foreground images are selected, and the plurality of combined images make up a moving image in which the at least two selected foreground images make up a foreground moving image and the at least two display background images make up a background moving image, and in which, at least one of the foreground moving image and the background moving image is reproduced at a speed that is different from a reproduction speed of the source image.

(21) The device as recited in (20), wherein a reproduction frame rate of the foreground moving image is different from a reproduction frame rate of the background moving image.

(22) An image processing method, including selecting at least one foreground image that has been separated from a source image; selecting at least two display background images from at least one background image that has been separated from the source image; and combining the at least one selected foreground image with the at least two display background images to generate a plurality of combined images, wherein at least one of the plurality of combined images does not appear in the source image.

(23) A non-transitory computer-readable medium storing a computer-readable program for implementing an image processing method, the method including selecting at least one foreground image that has been separated from a source image; selecting at least two display background images from at least one background image that has been separated from the source image; and combining the at least one selected foreground image with the at least two display background images to generate a plurality of combined images, wherein at least one of the plurality of combined images does not appear in the source image.

Moreover, the present technology can have the following configurations.

(1) An image processing device including a separation unit that, according to an imaging target object being imaged into a raw-material image, separates the raw-material image into a foreground image and a background image, an extraction unit that sets a display region which specifies a region which is defined as a display target with respect to the background image, and that extracts one part of the foreground image along the display region, and a combination unit that combines the foreground image with respect to the background image extracted by the extraction unit.

(2) The image processing device according to (1) in which, when the raw-material image is a still image, the extraction unit extracts one part of the background image as the display background image while moving the display region with respect to the background image, and in which the combination unit combines the extracted display background image with the foreground image.

(3) The image processing device according to (1) or (2), further including a determination unit that determines the foreground image that is combined with the display background image, based on the multiple foreground images that are separated from multiple sheets of still images that make up the moving image, wherein the raw-material image is a moving image.

(4) The image processing device according to any one of (1) to (3) wherein when the imaging target object that is defined as the foreground image is not imaged in the moving image as the raw-material image, the determination unit determines the foreground image into which the imaging target object is imaged for the last time, as the foreground image that is to be combined with the display background image.

(5) The image processing device according to any one of (1) to (4) in which the determination unit selects the foreground image into which the imaging target object is excellently imaged, as the foreground image that is to be combined with the display background image.

(6) The image processing device according to any one of (1) to (5), further including a determination unit that determines the foreground image and the background image that are combined with respect to the multiple foreground images that are separated from multiple sheets of still images that make up the moving image and the multiple display background images, respectively, according to reproduction speeds to which the foreground image and the background image are set, respectively, when the raw-material image is a moving image.

It should be noted that the present disclosure is not limited to the embodiments described above, and can be variously modified within a scope not departing from the gist of the present disclosure.

The present disclosure contains subject matter related to that disclosed in Japanese Priority Patent Application JP 2012-248391 filed in the Japan Patent Office on Nov. 12, 2012, the entire contents of which are hereby incorporated by reference.

What is claimed is:

1. An image processing device, comprising:
a foreground selection processing circuit to select, for each frame of a moving image, at least one foreground image that has been separated from the respective frame of the moving image and to select a corresponding background image that has been separated from a second frame of the moving image, the second frame having a frame count equal to a reproduction multiplication factor multiplied by a frame count of the respective frame from which the at least one foreground image was selected;
a combination circuit to combine, for each frame of the moving image, the at least one selected foreground image with the corresponding background image to generate a plurality of combined images,
wherein at least one of the plurality of combined images does not appear in the moving image.

2. The device as recited in claim 1, further comprising a separation circuit to separate each frame of the moving image into the at least one foreground image and a background image.

3. The device as recited in claim 1, wherein the plurality of combined images make up a moving image.

4. The device as recited in claim 1, wherein the reproduction multiplication factor corresponds to a user-selected reproduction effect.

5. An image processing method, comprising:
selecting, for each frame of a moving image, at least one foreground image that has been separated from the respective frame of the moving image and selecting a corresponding background image that has been separated from a second frame of the moving image, the second frame having a frame count equal to a reproduction multiplication factor multiplied by a frame count of the respective frame from which the at least one foreground image was selected; and
combining, for each frame of the moving image, the at least one selected foreground image with the corresponding background image to generate a plurality of combined images,
wherein at least one of the plurality of combined images does not appear in the moving image.

6. The method as recited in claim 5, further comprising separating each frame of the moving image into the at least one foreground image and a background image.

7. The method as recited in claim 5, wherein the plurality of combined images make up a moving image.

8. The method as recited in claim 5, wherein the reproduction multiplication factor corresponds to a user-selected reproduction effect.

9. A non-transitory computer-readable storage medium storing computer-readable instructions thereon, which, when executed by a computer, cause the computer to perform an image processing method, comprising:
selecting, for each frame of a moving image, at least one foreground image that has been separated from the respective frame of the moving image and selecting a corresponding background image that has been separated from a second frame of the moving image, the second frame having a frame count equal to a reproduction multiplication factor multiplied by a frame count of the respective frame from which the at least one foreground image was selected; and
combining, for each frame of the moving image, the at least one selected foreground image with the corresponding background image to generate a plurality of combined images,
wherein at least one of the plurality of combined images does not appear in the moving image.

10. The non-transitory computer-readable storage medium as recited in claim 9, further comprising separating each frame of the moving image into the at least one foreground image and a background image.

11. The non-transitory computer-readable storage medium as recited in claim 9, wherein the plurality of combined images make up a moving image.

12. The non-transitory computer-readable storage medium as recited in claim 9, wherein the reproduction multiplication factor corresponds to a user-selected reproduction effect.

\* \* \* \* \*